April 10, 1962 E. BERNHARDT ETAL 3,028,782
INTERFEROMETER FOR MEASURING SPHERICAL SURFACES
Filed Oct. 10, 1960 6 Sheets-Sheet 1

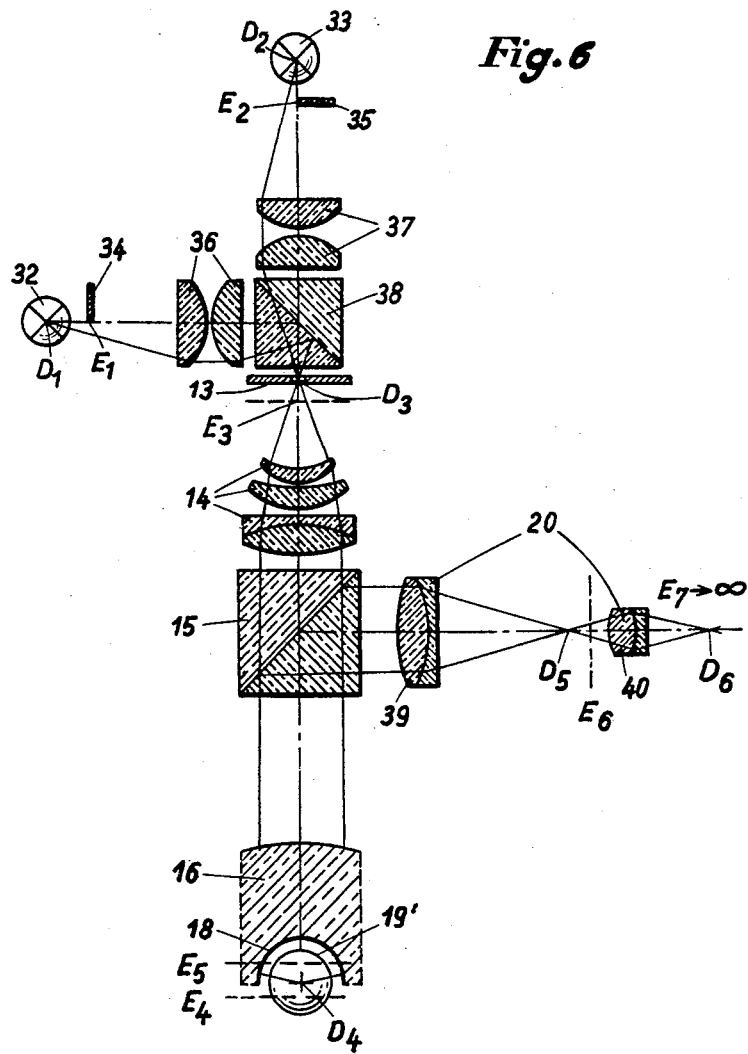

3,028,782
INTERFEROMETER FOR MEASURING
SPHERICAL SURFACES
Eugen Bernhardt, Am Felsenkeller 7, and Ewald Habermann, Schumannstrasse 17, both of Heidenheim (Brenz), Germany
Filed Oct. 10, 1960, Ser. No. 61,607
Claims priority, application Germany July 13, 1957
6 Claims. (Cl. 88—14)

The present invention relates to an interferometer for determining the shape and the dimension of spherical surfaces, particularly of balls for ball bearings, and is a continuation-in-part application of the inventors' application Serial No. 746,299, filed July 2, 1958, now abandoned.

The present measuring methods for determining the shape and dimensions of the balls in the manufacture of balls for ball bearings are predominantly mechanical in character. These methods are usually carried out by a point-for-point or line-for-line scanning of the spherical surface and therefore can not produce a perspective and uninterrupted picture of the spherical form. Furthermore, the accuracy of these measurements in most cases is insufficient for testing balls which are used in high precision ball-bearings which require very close tolerances.

For measuring optical surfaces such as, for instance, lens surfaces with a relatively small spherical angle it is preferred to employ interferometer methods. Well known is the employment of proof plate interferometers, the operation of which can be compared with the method using contact-free proof plates which are supplemented to a complete measuring instrument by the addition of a suitable illumination and observation device.

The principle of such a proof plate interferometer is described in an article by J. W. Kolomizov and J. J. Duchopel, entitled "Contact-Free Interference Method for the Control of Spherical Surfaces of Lenses," which appeared in the publication "Optic and Spectroscopy," vol. I (1956), No. 1, pages 94/101, published by the Academy of Sciences of U.S.S.R. This principle will be briefly explained on hand of FIG. 1 of the accompanying drawings, which figure has been taken from the above mentioned publication.

A real image of the opening A of a diaphragm 4, which is illuminated by a monochromatic light source 1, is projected to the point A' by a conventional microscope objective 6 which has a relatively large aperture and a short operating distance. On the other side of this small diaphragm image A' are provided a meniscus lens 7 and a lens 8. The surface $S_1$ of the lens 8 to be tested by an interferometer method, and the surface $S_2$ of the meniscus lens, which is used as a reference surface, form between the same an air space of uniform thickness and have their common center of curvature at the point where the diaphragm image A' is located. Due to the fact that also the surface of the meniscus lens has its center of curvature at the same point A', the meniscus lens will have, as an afocal system, no refractive power in the illustrated path of the rays. Due to the superposition of the wave train after same have been reflected by both surfaces $S_2$ and $S_1$, which enclose said air space, an interference image will be produced. The interference image is made visible over a semi-transparent mirror 5 by means of a telescope 9, 10.

As long as the reference surface $S_2$ and the surface $S_1$, which is to be tested, have a correct spherical form and their center of curvature exactly coincide, the interference image will be of a uniform intensity owing to equal phase difference in the air space. Defects in the shape of the spherical surface to be tested will produce phase differences which will appear as brightening or darkening of the interference image. When the centers of curvature of the two surfaces $S_1$ and $S_2$ which are in interference with each other, are displaced relatively to one another, a shift in the direction of the optical axis will result in an interference image of concentric rings. In case of a shift in a direction transversely to the optical axis a system of straight, parallel interference fringes will be produced. When the shape of the surface to be tested deviates from a spherical form, deviations of the circular rings from their circular form will be produced in the first mentioned case, while a characteristic bending of the straight interference fringes will be observed in the second case. These phenomena will enable one to make a sensitive conclusion with regard to the defects in the form of the spherical surface. The above described method is particularly applicable for testing of spherical surfaces having a hollow curvature, because the microscopic objective which is used as an interferometer objective has a high aperture. The shortness of the operating distance (the backfocus of the objective to the point A') is irrelevant for the functioning of the device. During the testing of hollow surfaces it will be thus possible to detect only spherical sections, the spherical angles of which are at the most equal to the aperture angle of the microscopic objective used.

Microscopic objectives are obviously not suitable for the measurements of convex spherical surfaces, because of the shortness of their working distance. On the contrary, for this purpose it becomes necessary to employ as interferometer objectives systems of the type of photographic objectives with a large relative aperture. The working distance of these types of objectives can be selected by a suitable choice of the focal length to be so great that the radius of the spherical surface to be tested and the meniscus surrounding same will find sufficient space between the front lens of the objective and the ray-junction point A'. The range of the spherical angle which can be covered with the above described arrangement is, however, rather limited. Even when an objective is used which has a large relative opening $f:1$, the spherical angle to be covered will be only 53°. It is obvious that this method is not suitable for examining the entire surface of sphere. Measurements for such a determination can be obtained only by an extrapolation of a number of single measurements, or by adding the results of a number of individual measurements obtainable over a number of spherical angle ranges.

As mentioned above, the present invention relates to an interferometer of the type of proof plate interferometers. Under the term of proof plate interferometer is hereby understood a device which has the task to fulfill the proof plate testing without any contact between the reference surface and the surface of the object to be tested.

Such an instrument must contain, in addition to the reference surface, optical means for illumination, means for producing interferences between the wave trains, which are reflected on the reference surface and the surface of the object to be tested, as well as means for observing these interferences.

The object of the present invention is an interferometer of the proof plate interferometer type which will eliminate the above described disadvantages of measuring a limited spherical angle. For this purpose the objective of the interferometer comprises a front lens, the outer surface of which serves as a reference surface and is designed in form of a hollow spherical section, which may extend down to the equator or slightly further and which concentrically encloses (with an air space therebetween) the sphere to be tested.

The present invention will now be described on hand of the accompanying drawings, wherein:

FIG. 6 shows a modification of the optical arrangement of the interferometer according to the present invention.

Figure 2:
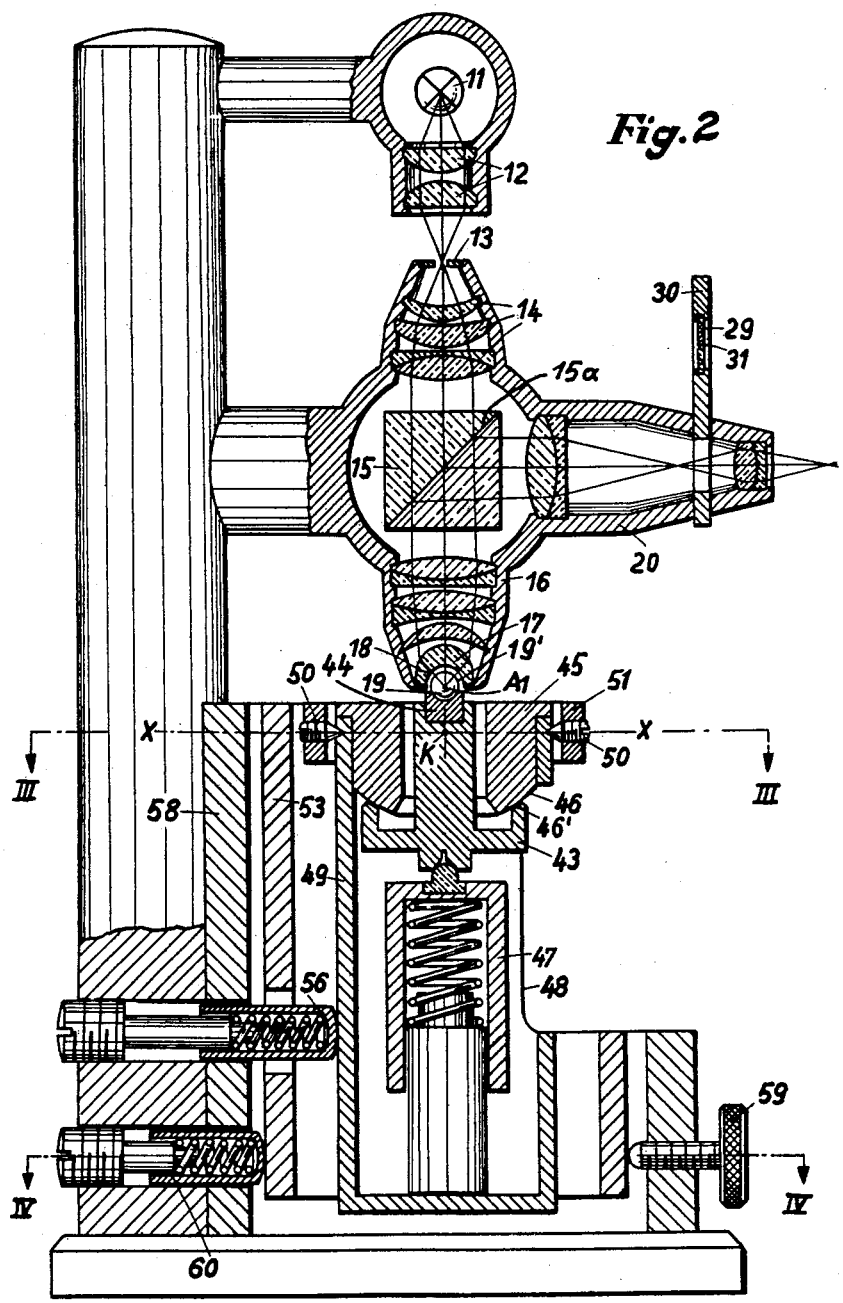
FIG. 2 is a vertical cross section of the interferometer of the present invention.

Referring to FIG. 2, the numeral 11 indicates a monochromatic light source such as, for instance, a thallium spectral lamp, the rays of which are concentrated by a collector lens 12 into the aperture of the diaphragm 13. The picture of this illuminated opening is projected by a collimator 14 into infinity. Along the axis of the rays are arranged the following parts: A prism 15 provided with a semi-transparent mirror layer 15a and the objective 16 of the interferometer. This objective 16 comprises the front lens 17 with its outer surface 18 formed in accordance with the present invention. This surface 18 surrounds concentrically in spaced relation the outer surface 19' of the sphere 19 to be tested. It will be noted that an air space is provided between the surfaces 18 and 19'. Other optical elements of the objective are designed in known manner similar to the objective of a microscope having a high relative opening which will produce an aplanatic projection of the picture of the diaphragm 13 in the center of the curvature $A_1$ of the concave outer surface 18 of the front lens which center coincides with the center of curvature of the sphere 19 to be tested.

The interferences are produced by the superposition of the wave trains reflected on the reference surface 18 and the outer surface of the sphere 19'. After being reflected by the semi-transparent mirror surface 15a of the prism 15, the interference image can be observed by a telescopic magnifier 20. Under the assumption that the concave outer surface of the front lens 18 extends down to the equator, it becomes possible to obtain an interference image of one half of the entire spherical surface of the sphere to be tested when the objective has a suitably large aperture. It should be considered, however, that due to the effective sine condition the image will be in form of parallel projection of the interference figure upon the equator surface of the semi-sphere. A disadvantage of this method is that the equatorial details of the spherical surface will be presented in the image of the parallel projection only in a hazy manner.

In order to effect an improvement, it is another object of the invention to construct the objective of the interferometer in such a manner that instead of the parallel projection an approximately true image-to-center azimuthal projection of the interference image is produced. The means which produce this result of the present invention will be described with reference to the accompanying FIG. 5 which shows a four-lens objective of an interferometer which is used in place of the objective designated in FIG. 2 by the numeral 16.

Figure 5:
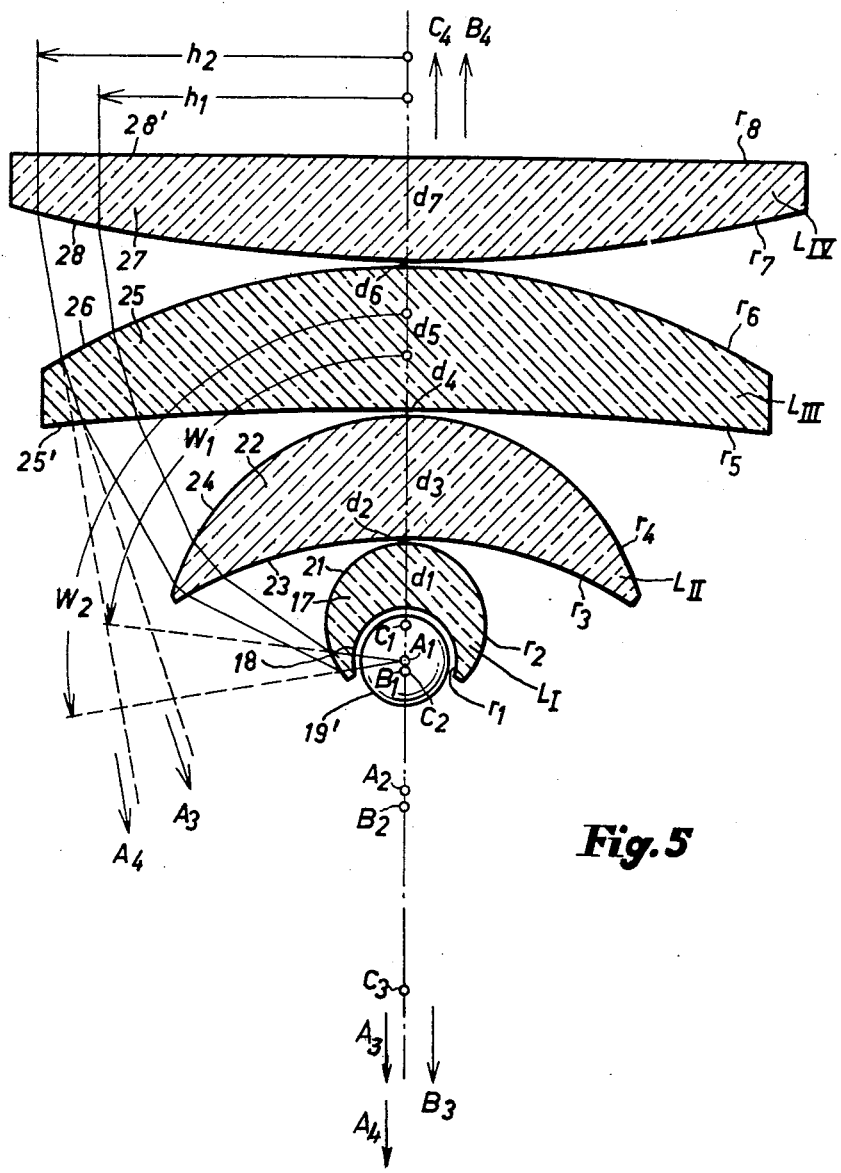
FIG. 5 shows in sectional view an exemplary embodiment of an actually performed lens arrangement for which exact design data are given below.

In the embodiment of the invention as shown in FIG. 5, the right hand half of this figure has inserted therein the designations for the lenses, radii and thicknesses in accordance with the following Table I showing the data of an example:

Table I

| Lenses | Radii | Distances | $n_e$ |
|---|---|---|---|
| $L_I$ | $r_1=+2.778$ | $d_1=3.14$ | 1.7919 |
| | $r_2=+3.981$ | $d_2=0.05$ | |
| $L_{II}$ | $r_3=+22.71$ | $d_3=6.00$ | 1.7686 |
| | $r_4=+12.409$ | $d_4=0.10$ | |
| $L_{III}$ | $r_5=+193.87$ | $d_5=7.00$ | 1.7686 |
| | $r_6=+35.728$ | $d_6=0.10$ | |
| $L_{IV}$ | $r_7=79.75$ | $d_7=7.00$ | 1.7686 |
| | $r_8=\infty$ | | |

The front lens 17 of the objective is provided with an outer concave surface 18 which faces the spherical surface 19' of the object to be tested. The surface 18 has the shape of a hollow sphere, in fact, it is larger than one half of a complete sphere and is arranged in such a manner that the common center of curvature $A_1$ of the surfaces 18 and 19' which interfere with one another will be disposed between the aplanatic point $B_1$ and the center of curvature $C_1$ of the surface 21. In case the aplanatic point $B_1$ would coincide with the center of the sphere $A_1$, due to the fulfilled sine condition, the ray which passes under an angle $w=90°$ through the equator will fall onto the convex surface 21 of the front lens 17 at an angle of total reflection and will leave this surface after refraction in tangential direction. It follows, therefore, that for a totally aplanatic objective the equator of the sphere will be at the same time also the picture horizon for the representation in parallel projection.

In the arrangement according to the present invention, as shown in FIG. 5, all the rays which diverge from the center of the sphere $A_1$ will impinge the surface 21 under an incidence angle which is smaller than the angle of total reflection and will leave this surface after refraction not in tangential direction, but in a further diverging dispersive manner. The same action will be observed also in case of rays which are directed, as shown, at spherical angles $w_2>90°$ and are deflected due to the concentrating effect of the surface 21 in such a manner that same can be employed for projecting a certain spherical range disposed on the other side of the equator.

The center of the sphere $A_1$ will thus be projected due to the surface 21 to $A_2$, however, not in an aberration-free manner but with a considerable amount of overcorrection.

According to the present invention the same procedure is repeated by correspondingly choosing the curvatures of the surfaces 24 and 26 of the lenses 22 and 25, i.e. the virtual images $A_2$ and $A_3$ of the center of the sphere lie between the aplanatic points $B_2$ and $B_3$ and the centers of curvatures $C_2$ and $C_3$ of these surfaces 24 and 26.

In FIG. 5 the virtual picture points are designated with A, the aplanatic points are designated with B, and the centers of the curvatures of the refracting surfaces are designated with C. Their relative position to each other constitutes the object of the non-aplanatic objective of the present invention and is disclosed in the following Table II:

Table II

| Indices | A | B | C | Measured from the crest of the surface |
|---|---|---|---|---|
| 1 | 5.918 | 6.203 | 3.9811 | $r_2$ |
| 2 | 18.47 | 19.43 | 12.409 | $r_4$ |
| 3 | 55.35 | 55.95 | 35.738 | $r_6$ |
| 4 | 95.70 | −124.84 | −79.75 | $r_7$ |

This Table II shows that the picture points $A_1$, $A_2$ and $A_3$ are positioned in each case between the aplanatic points $B_1$, $B_2$ and $B_3$ and the centers of the curvatures $C_1$, $C_2$ and $C_3$, respectively, of the associated refractive surfaces. The distances of the aplanatic point from the crest of the associated surface having the radius of curvature $r$ of a lens having a refractive index $n$ is calculated in known manner by using the formula $$s = r\frac{n+1}{n}$$

(See Berek, "Grundlagen der praktischen Optik," Leipzig 1930, page 98.)

The result of the triple repetition of the feature of the invention consists in the intentional disregard of the Abbe's sine condition which gives, as is known, in the front elements of the objective a substantial amount of spherical overcorrection.

Therefore the present invention provides additional surfaces 23, 25' and 28 which also have a concentrating effect but are causing spherical undercorrection which will compensate the above mentioned overcorrection, but will not compensate the sine error. For demonstrating the principle of this compensation it will be sufficient to refer to the action of the surface 28 of lens 27, though also the hollow surfaces 23 and 25' contribute to this compensating effect as does surface 28.

The rear lens of the objective, as shown, is curved reversely ($r_7 = -79.75$). In such a case the virtual picture point $A_4$ lies on one side and the center of curvature $C_4$ and the aplanatic point $B_4$ of the refractive surface $r_7$ are positioned on the opposite side of the rear lens (see Table II). It is true that the contribution of this surface $r_7$ toward the sine deviation is small, but this contribution together with the smaller contribution of the surfaces 23 and 25' introduces such a large amount of spherical undercorrection into the system that the entire system can be considered as sufficiently spherical corrected.

Figure 5A:
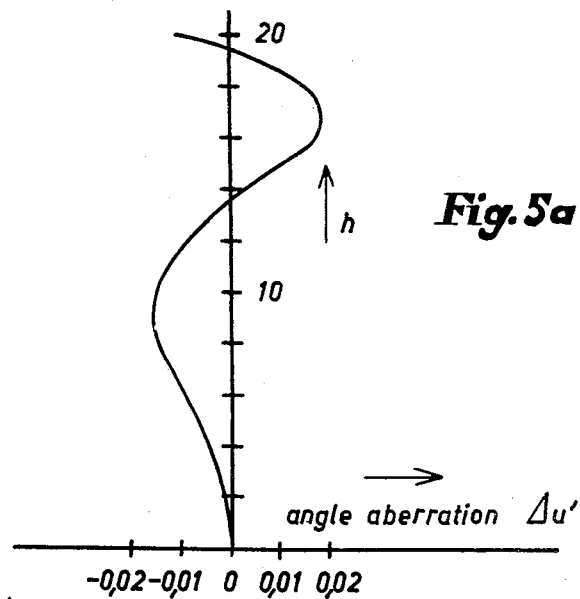
FIG. 5a shows a diagram of the spherical aberrations of the lens arrangement according to FIG. 5.

The corrected condition of this numerical example is illustrated in FIG. 5a. The ordinate values for the aperture of the objective are entered as spherical angles, and the abscissa indicates the spherical aberrations, which latter, however, are not measured in linear aberrations as customary, but in angular aberrations in absolute values with reference to aberration-free light beams directed toward the center of the sphere. As shown, the objective possesses a double zone error of spherical aberration which is, however, of no consequence.

The sine-error, which was intentionally introduced by the front elements, expresses itself in this that the rays which enter the system at the spherical angles $w_1$ and $w_2$ leave the system in parallel manner, i.e. free of aberration with the altitudes $h_1$ and $h_2$. Thus it is possible to produce, in place of the Abbe sine-condition of an aplanat $h \sim$ sine $w$, a satisfactory approximation to the arc-condition $h \sim$ arc $w$, as it is defined in the non-aplanatic system of the present invention. According to the cartographic terminology the spherical image obtained is equivalent to the image-to-center azimuthal projection. This case is illustrated in FIG. 5 by the indicated values of $w_1$, $w_2$ and $h_1$ and $h_2$. In the practice of testing the spherical form this indicates that the details of the outer surface, regardless whether same are disposed close to the poles or the equator or even slightly outside the equator, can be projected with a unitary radial scale.

Figure 5B:
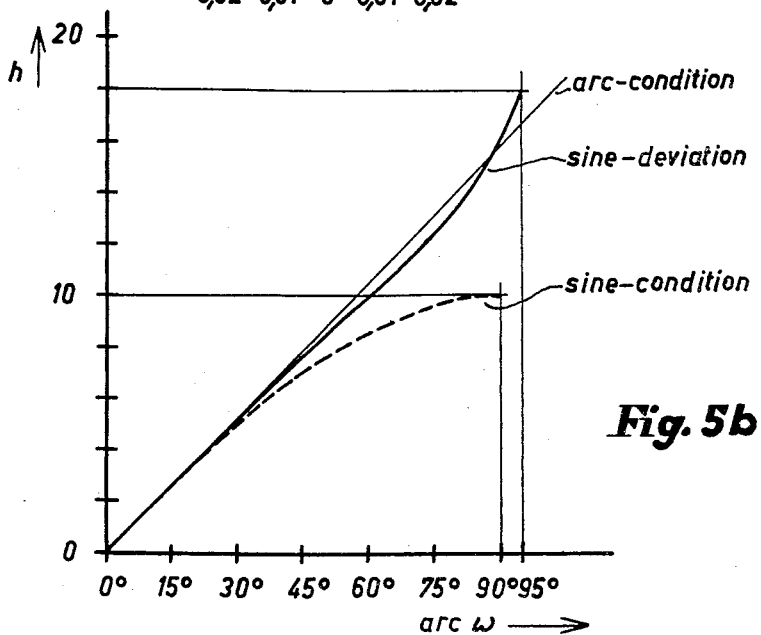
FIG. 5b shows a diagram of the approximate arc-condition of this lens arrangement in comparison with the Abbe's sine-condition of an aplanatic lens.

The projection function of the numerical example of the lens system is illustrated in FIG. 5b. In this FIG. 5b the abscissa designates the spherical angle while the ordinate designates the exit altitudes $h$. It is apparent that the projection function of the numerical example of Table I, which is shown in a solid line provided with the legend "sine deviation," extends very closely to the straight line which is drawn into this figure and carries the legend "arc condition." The picture altitudes $h$, however, assume beyond the equator of the sphere an additional increase; the calculation was completed up to a spherical angle of $2 \times 95°$. In addition, there has been inserted in FIG. 5b in a dash-line the projection function of an aplanat with accomplished Abbe sine-condition. In an aplanat the picture altitudes reach the maximum value at spherical angles of $2 \times 90°$, namely when the spherical equator is equal to the picture horizon. An aplanat of such qualification was required by Williams (see British Patent No. 602,459). Even though it is basically possible to obtain with such an aplanat a projection of a sphere up to a maximum value of $2 \times 90°$, the details of the projection surface can no longer be recognized in the neighborhood of the spherical equator owing to the presence of parallel projection.

In view of this advantage of the interferometer of the present invention, the measuring range of which extends to one half of a spherical surface and even farther, it is possible according to a further object of this invention to make substantially more accurate interferometric measurements of the diameter of the sphere. While, in case of interferometers whose measuring range extends only over a small spherical angle, the measurement of the diameter is possible only by means of extrapolation, this extrapolation is eliminated according to this invention. According to the present invention the measurement of the diameter of the sphere is based upon the determination of the thickness of the air gap between the reference surface and the spherical surface, whereby the thickness of said air gap is determined interferometrically from the ordinal number of the interference picture. The determination of the ordinal number again takes place indirectly in that two interference pictures are produced one adjacent the other in the picture field by means of two monochromatic rays of different but known wave length, and the desired ordinal number is read off from the characteristic coincidences of said pictures. The interferometer of the present invention is, therefore, constructed in such a manner that means are provided for producing two monochromatic beams of light and that additional means are provided for subdividing the interference picture along a separating line into two half fields with separate allotment of the interferences produced by said two monochromatic beams of light.

An example of such an arrangement for determining the diameter of spheres is shown in FIG. 2. In this case the lamp 11 has to produce the necessary monochromatic rays of different wave length. If, for instance, a mercury-cadmium-spectroscopic lamp is used as the light source 11, the rays of the green Hg-line and the rays of the red Cd-line may advantageously be used for producing the two interference images. The subdivision of the interference image along a separating line into two halves is effected by means of a filtering device 29 which is provided in a slide 30, which can be pushed into the path of the rays of the observation telescope 20 for determination and measurement of the diameter.

The filtering device 29 is subdivided along a separating line 31 into two half areas in such a manner that each half area is spectrally permeable only for one of the two types of rays. The filtering device is disposed in the path of the rays in a position which corresponds to substantially the image plane, namely approximately in the plane of the intermediate image of the telescope 20, so that the subdivision of the image field is effected along a sharp separating line.

Another modification of the arrangement for measuring the diameter of a sphere is shown in FIG. 6. According to the present invention the two monochromatic rays of different wave length are produced by two separate light sources 32 and 33, such as for instance a thallium spectroscopic lamp for producing the wave length of the green Tl-line of 5350 A., and a thallium spectroscopic lamp, provided with a suitable filter, for the wave length of the red Cd-line of 6438 A. Two semi-circular diaphragms 34 and 35 are arranged in the path of the rays of these lamps. These diaphragms have their diameter edges placed at $E_1$ and $E_2$. These diaphragms, therefore, will each mask one half of the cross-section of the two monochromatic beams. Each of the beams will be concentrated by a condensing lens system 36 and 37 respectively and will be directed into the path of the rays of the interferometer by a division prism 38. The diaphragms, which produce the subdivision of the interference image along a separating line into two half areas, are disposed according to the present invention, in planes which are approximately conjugate to the image plane. This arrangement will now be explained in detail on hand of FIG. 6. The images of the two light sources $D_1$ and $D_2$ of the spectroscopic lamps 32 and 33 are projected into the aperture 13 of the diaphragm $D_3$ of the aperture diaphragm 13. The diaphragm edges $E_1$ and $E_2$ of the diaphragms 34 and 35 are disposed in the illustrated arrangement on the other side of the image position $D_3$ by the condenser systems 36 and 37 in the plane $E_3$. The two diaphragm edges are adjusted relative to each other in such a manner that the two semi-circular areas of the two light beams exactly abut one another and form a circular area. A real image of the diaphragm $D_3$, which lies in the focal plane of the collimator 14, is projected by the latter and the interferometer objective 16 into the center of curvature $D_4$ of the sphere to be tested, and the image of the edge of the diaphragm $E_3$ will be accordingly projected to the other side of $D_4$ towards $E_4$. From this real image $E_4$ of the edge of the diaphragm will be produced, after reflection on the reference surface 18 and the sphere surface 19', a virtual image in the plane $E_5$. The plane $E_5$ is displaced to a small extent somewhat upwardly with respect to the center of the sphere $D_4$. Its position corresponds to the most advantageous adjustment plane for the observation of the mean height of the semi-spherical curved interference image arranged on the reference surface. Since now, according to the present invention, a diaphragm position has been produced which is approximately conjugate to the image plane, the further formation of the interference image is effected as follows:

After being reflected by the surfaces 18 and 19' the image $D_4$ of the diaphragm is projected by means of the interferometer objective 16 and the telescope objective 39 of the observation telescope 20 towards $D_5$. An image of the interference figure and of the edge $E_5$ of the diaphragm will accordingly be formed on the other side of $D_5$ in the plane $E_6$. This plane $E_6$ is the plane of the intermediate image of the observation telescope 20, which is sharply adjusted to the mean height of the interference figure. The ocular lens 40 projects the diaphragm aperture image $D_5$ towards $D_6$ as the exit pupil of the telescope. The intermediate image $E_6$ of the interference figure, which lies in the focal plane of the ocular lens will be projected by same towards $E_7$ into infinity The invention provides a possibility of extending the measurements on spherical surfaces into the range of larger spherical angles and indicates certain requirements for the mechanical construction of such interferometers with regard to the arrangement of the sphere to be tested with respect to the optical system. As long as the measurements are limited in a proof plate interferometer to a small spherical section of lenses, it will be sufficeint to support the specimen in a zone directly outside of the testing range in a ring or three point support. But this method cannot be employed in the interferometer according to the present invention, in which the testing of spheres is extended up to the equator and further. On the contrary, the spheres to be tested must be supported on the rear side, which faces away from the area to be measured, preferably in such a manner that the center of the sphere is always centered to a reference point fixed in the device, which point forms also the center of curvature of the reference surface.

Figure 1:
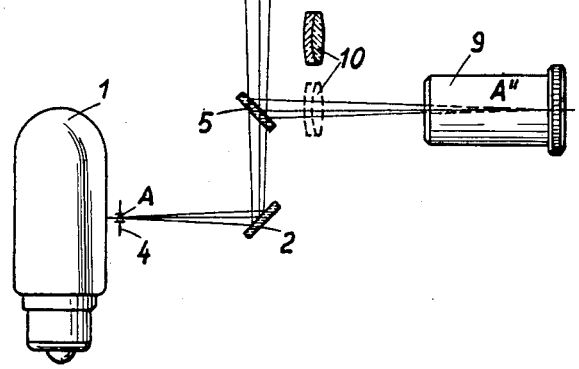
FIG. 1 illustrates, as already stated in the foregoing, a prior art arrangement.
Figure 7:
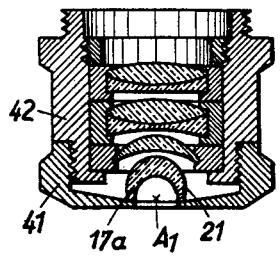
FIGS. 7, 8 and 9 show each a vertical cross sectional view of an objective of an interferometer with three different front lenses.
Figure 8:
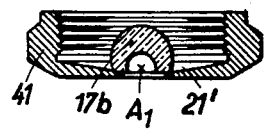
Figure 9:
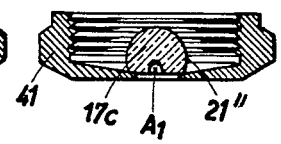

For the purpose of testing spheres of different diameters, there are used front lenses with suitable different curvatures of the reference surface, which are, according to the present invention, arranged exchangeably on the objective of the interferometer, in such a manner that the position of the center of curvature of the reference surface in the device remains the same when the front lenses are exchanged. FIG. 7 shows an interferometer objective which, according to the invention, is provided with exchangeable front lenses. The exchange of the front lenses, which are mounted each in a separate lens barrel 41, is effected by screwing the barrel 41 to the objective mount 42. According to the FIGS. 7 to 9 all of the front lenses 21, 21' and 21" have the same size and also the same as well as the position of the convex rear surfaces of the same is the same as well as the position of the center of curvatures $A_1$ of the reference surfaces, but not their radii.

For receiving that portion of the spheres to be tested, which faces away from the portion to be measured, the present invention provides as shown in FIG. 2 exchangeable holders 43 provided with a ball socket 44. A calotte 45 with an annular spherical zone 46 is employed for receiving said holders 43, said zone 46 being concentrically curved relative to the center of curvature of the reference surface and on which said holders are arranged. The holders in addition to the ball socket 44 are also provided with an annular spherical zone 46' which is concentric to said socket 44. The holders are retained in their position by means of a spring containing sleeve 47. The exchange of these holders 43 is possible through an opening 48 in the housing.

The possibility to insert, according to the present invention, the spheres in unchanged centered position into the interferometer is insufficient for the practice of interferometer measurements owing to three reasons. Firstly, the accuracy of centering of a mechanical arrangement is insufficient per se, as compared with the accuracy with which an interferometer arrangement has to be adjusted. Secondly, there must be provided the possibility of a fine readjustment of the interference figure, when spheres are interchanged, which have the same nominal diameter but are of different actual diameter in the tolerance range. Thirdly, in case of certain measuring methods, it is necessary to provide the possibility of influencing at random the centering of the spherical and reference surfaces relative to each other, in order to adjust the interference images with concentrical rings or parallel bands. For the purpose of such fine adjustment the present invention provides that the annular spherical zone 46, which is used for support of the holders for the sphere to be tested, is adjustably arranged so as to displace by small amounts in vertical direction and sidewardly the respective zone relative to the center of curvature of the reference surface.

Figure 3:
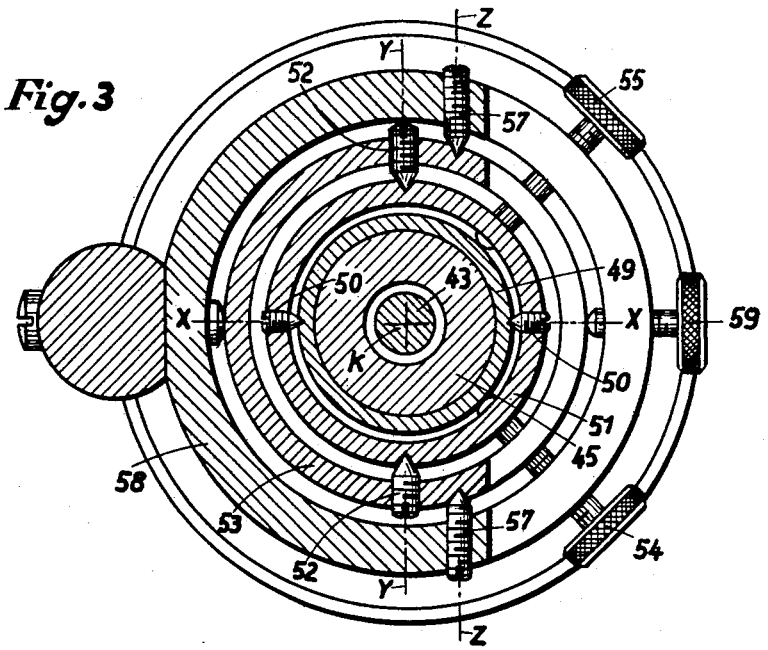
FIGS. 3 and 4 show each a horizontal cross section of the interferometer along the lines III—III and IV—IV of FIG. 2.
Figure 4:
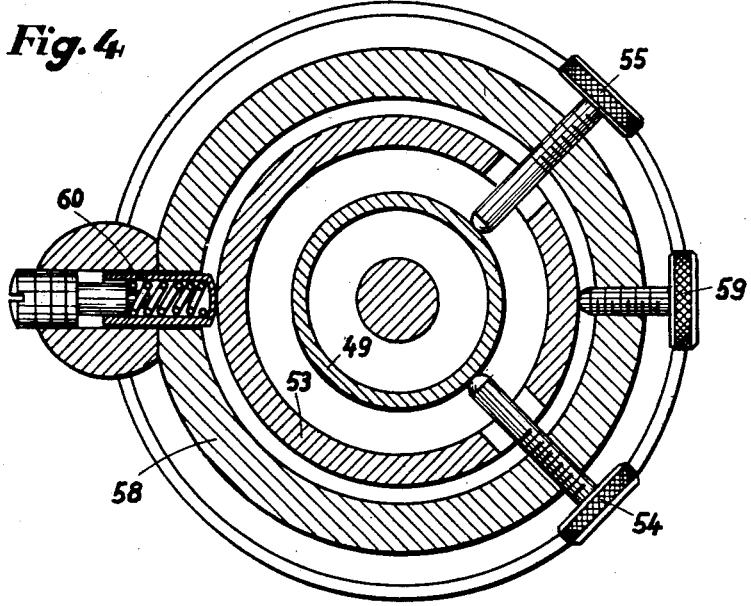

An example of the fine adjustment arrangement, as may be employed in accordance with the present invention, is shown in FIGS. 2 to 4. The calotte 45, which is used for supporting the holder 43 is connected with a tubular sleeve 49. For the sideward adjustment of the center of the sphere is provided a cardanic suspension, the axes X—X and Y—Y of which intersect in point K, which is displaced in vertical direction relative to the center of the sphere $A_1$. The sleeve 49 is rotatably arranged about an axis X—X passing through the pointed elements 50 carried by a cardanic ring 51. This ring 51 is also rotatably arranged around the axis Y—Y by means of other pointed elements 52 in a further cardanic ring 53.

A rotation of the cardanic suspension around the cardan point K is effected in such a manner that two threaded spindles 54 and 55 arranged at right angles to each other act upon the lower end of the tubular sleeve 49, a spring actuated sleeve 56 providing the third point of engagement between the two spindles and the tubular sleeve. When actuating the spindles, the points of engagement of which with the tubular sleeve are displaced relative to the cardan point K by a long lever arm so that the center of the sphere 19 will be moved sideways by small amounts.

In order to provide the possibility of adjusting the center of the sphere in vertical direction, the outer cardan ring 53 is rotatably supported by two additional elements 57 forming between the same an axis Z—Z in the housing of the interferometer 58, said axis being displaced relative to the parallel axis Y—Y in the cardan plane.

The outer cardan ring 53 is also extended downwardly in form of a tubular sleeve. Upon actuating a further threaded spindle 59 the outer cardan ring 53 will rotate about around the axis Z—Z so that a vertical movement of the cardanic suspension and thus of the sphere to be tested will be effected by small amounts. A further spring actuated sleeve 60 provides the necessary abutment of the spindle 59 with the sleeve 53.

What we claim is:

1. In an interferometer of the type employing a proof plate and used for testing the shape of spherical surfaces by monochromatic light interferences, particularly of balls used in ball bearings, said interferometer comprising an interferometer objective, a monochromatic light source and an optical system arranged to convert the beam of light from said source into a parallel beam directed to said interferometer objective and to said ball testing surface located behind and adjacent said objective, a prism provided with a semitransparent mirror layer located between said optical system and said interferometer objective, and a telescope magnifier arranged in the parallel beam of light coming back from said ball testing surface and being reflected from said semitransparent mirror layer for observing interference fringes, said interferometer objective having a front lens serving as said proof plate said front lens having a front face which is employed as reference surface, said front face having the shape of a hollow sphere extending close to and beyond its equator and being arranged to concentrically surround the ball to be tested, the spherical surface of the ball to be tested being positioned with respect to said reference surface so as to form an air gap between the same in such a manner that interference fringes arise by reflexions of the wave front of said beam between said spherical test surface and said reference surface, said interferometer objective consisting of said front lens and additional lenses in axial alignment, said front lens and part of said additional lenses having light convergent surfaces of strong refractive power curved in such a manner that the common center of curvature of both reference surface and ball surface and the virtual images of the said center are located between the aplanatic points of the respective light convergent surfaces and the centres of curvature of these surfaces, thus causing sine-error and therewith spherical overcorrection, the said additional lenses having other surfaces which also have light convergent action, but are of distinctly smaller refractive power and are curved in such a manner that the virtual images of the said common center of curvature are located beyond the range between the respective aplanatic points and the centres of curvature of said surfaces thereby causing a spherical undercorrection which compensates said spherical overcorrection but do not compensate the said sine-error caused by the first mentioned surfaces.

2. In an interferometer according to claim 1 a single light source emanating a light beam containing two monochromatic radiations of different wave lengths, and a filter arrangement located in a plane conjugate to the image plane and consisting of two filters each one for filtering one said monochromatic radiation, and each one covering one half of the image plane thus subdividing said image along a separation line.

3. In an interferometer according to claim 1, two light sources (32; 33) each one emanating a beam of monochromatic light radiation of different wave lengths, two diaphragms (34; 35) each one located in a conjugate plane of the image plane and having their diaphragm edges ($E_1$; $E_2$) located so as to mark opposite halves of the image, a prism having a partially reflecting and partially transmitting layer for directing both said beams into the direction of the common optical axis of the interferometer such that each one of said beams fills one half of the complete image field, whereby the said edges of said diaphragm are sharply focussed on to the image plane thus forming a common boundary for said image halves and their different wave lengths.

4. In an interferometer according to claim 1 in which for the purpose of testing balls of different diameter means are provided for exchanging said front lens by another one having a reference surface of a different curvature, whereby the position of the center of curvature of the reference surface in the device remains always the same.

5. In an interferometer according to claim 1 including a holder for the ball to be tested, a member provided with an annular spherical zone arranged concentrically to the center of curvature of the reference surface, said holder engaging said member along a spherical counter surface corresponding to said annular spherical zone, said holder also carrying a ball socket which is concentrical to said annular spherical zone and serves for receiving the ball to be tested.

6. In an interferometer according to claim 1 including a holder for the ball to be tested, a member provided with an annular spherical zone arranged concentrically to the center of curvature of the reference surface, said holder engaging said member along a spherical counter surface corresponding to said annular spherical zone, said holder also carrying a ball socket which is concentrical to said annular spherical zone and serves for receiving the ball to be tested, and means for adjusting said member having said annular spherical zone about small amounts in vertical direction and sideways relative to the center of curvature of the reference surface.

References Cited in the file of this patent

UNITED STATES PATENTS 2,866,374    Lewis et al. _____ Dec. 30, 1958

FOREIGN PATENTS 602,459    Great Britain _____ May 27, 1948

UNITED STATES PATENT OFFICE
CERTIFICATE OF CORRECTION

Patent No. 3,028,782                                       April 10, 1962

Eugen Bernhardt et al.

It is hereby certified that error appears in the above numbered patent requiring correction and that the said Letters Patent should read as corrected below.

In the grant, lines 1, 2 and 3, for "Eugen Bernhardt and Ewald Habermann, both of Heidenheim (Brenz), Germany," read -- Eugen Bernhardt and Ewald Habermann, both of Heidenheim (Brenz), Germany, assignors to Carl Zeiss, of Oberkochen, Wuerttemberg, Germany, --; line 12, for "Eugen Bernhardt and Ewald Habermann, their heirs" read -- Carl Zeiss, his heirs --; in the heading to the printed specification, lines 4, 5 and 6, for "Eugen Bernhardt, Am Felsenkeller 7, and Ewald Habermann, Schumannstrasse 17, both of Heidenheim (Brenz), Germany, read -- Eugen Bernhardt and Ewald Habermann, both of Heidenheim (Brenz), Germany, assignors to Carl Zeiss, Oberkochen, Wuerttemberg, Germany --.

Signed and sealed this 4th day of September 1962.

(SEAL)
Attest:
ERNEST W. SWIDER
Attesting Officer

DAVID L. LADD
Commissioner of Patents